US012732303B1

(12) United States Patent
Ambati et al.

(10) Patent No.: US 12,732,303 B1
(45) Date of Patent: Sep. 8, 2026

(54) EYE WIDTH SWEEP TEST FOR USE IN DATA TRANSMISSION

(71) Applicant: Cadence Design Systems, Inc., San Jose, CA (US)

(72) Inventors: Satish Kumar Ambati, Telangana (IN); Parekh Jigar Prakashbhai, Bengaluru (IN); Vikas Kumar Agrawal, Bangalore (IN)

(73) Assignee: Cadence Design Systems, Inc., San Jose, CA (US)

( * ) Notice: Subject to any disclaimer, the term of this patent is extended or adjusted under 35 U.S.C. 154(b) by 8 days.

(21) Appl. No.: 18/598,275

(22) Filed: Mar. 7, 2024

(51) Int. Cl.
*H04L 1/00* (2006.01)

(52) U.S. Cl.
CPC .......... *H04L 1/0041* (2013.01); *H04L 1/0061* (2013.01)

(58) Field of Classification Search
CPC ................ H04L 1/00; H04L 7/00; H03K 3/00
USPC ..................................... 714/731; 326/28, 96
See application file for complete search history.

(56) References Cited

U.S. PATENT DOCUMENTS 7,900,098 B2 * 3/2011 Becker .................... H04L 25/05 324/76.11
8,832,487 B2 * 9/2014 Fiedler ...................... G06F 1/10 713/502
9,620,184 B1 * 4/2017 Bialas, Jr. ................ G11C 7/22
9,715,907 B1 * 7/2017 Rao .......................... G11C 7/00
9,917,685 B2 * 3/2018 Hammad .............. H03L 7/1075
10,083,736 B1 * 9/2018 Jeter ........................ G06F 13/16
10,734,983 B1 * 8/2020 Jeter ..................... G11C 11/409
11,157,350 B2 * 10/2021 Froelich .................. G06F 13/14
11,196,425 B1 * 12/2021 Lin ....................... H03L 7/0818
2007/0025483 A1 * 2/2007 Emami-Neyestanak ................... H04L 7/0337 375/355
2009/0202027 A1 * 8/2009 Yin .......................... H03L 7/06 375/355
2011/0239031 A1 * 9/2011 Ware ......................... G06F 1/12 713/500
2025/0224447 A1 * 7/2025 Fayneh ............ G01R 31/31717

FOREIGN PATENT DOCUMENTS

EP 4113519 B1 * 10/2025 ............. G11C 29/46

* cited by examiner

*Primary Examiner* — Albert Decady
*Assistant Examiner* — Grace V Braden
(74) *Attorney, Agent, or Firm* — Mark H. Whittenberger; Holland & Knight LLP

(57) ABSTRACT

The present disclosure relates to systems and methods for performing an eye width sweep test associated with a transmission protocol. Embodiments may include initiating, via a transmitter, data to clock training on all lanes and comparing, at a receiver, an incoming signal from the transmitter with an expected signal. Embodiments may also include sending a pass/fail result from the receiver to the transmitter and analyzing all possible passing ranges in a single full eye width.

14 Claims, 10 Drawing Sheets

300

400

500

600

700

800

| State | Description |
|---|---|
| IDLE state | In this state, eye sweep width test not started, and the state machine is waiting for Start_DualSearchEyeSweep_test signal to be driven active at that time moves FSM to **INIT_ST** state |
| INIT_ST state | Initializes PI code = 0, Max Pass Range = 0 and moves FSM to **CHECK_DATA_ST1** state |
| CHECK_DATA_ST1 state | In this state, BER is checked and if errors received, FSM moves to "CHECK_PI_ST1" state to check if current PI position is at max code. If no errors received in data reception, FSM FSM moves to "SAVE_START_CODE_ST" state |
| CHECK_PI_ST1 state | In this state, FSM checks if current PI code is reached to Max code. If yes, then stops the search and FSM moves to **DONE** state. If not, FSM moves to **INCR_ST2** state to increment PI code |
| INCR_ST2 state | In this state, FSM increments current PI position by 1 and moves to **CHECK_DATA_ST1** |
| SAVE_START_CODE_ST state | In this state, FSM saves the current PI code as ***Current Pass Start code*** and moves to **CHECK_PI_ST2** state |
| CHECK_PI_ST2 state | In this state, FSM checks if current PI code is Max code. If yes, moves FSM to **SAVE_END_CODE** state. If not, FSM moves to **INCR_ST1** state to increment PI code |
| INCR_ST1 state | In this state, FSM increments current PI position by 1 and moves to CHECK_DATA_ST2 |
| CHECK_DATA_ST2 state | In this state, BER is checked and if no errors received, FSM moves to "**CHECK_PI_ST2**" state to check if current PI position is at max code. If errors received in data reception, FSM moves to "**DECR_ST**" state |
| DECR_ST state | In this state, FSM decrements current PI position by 1 and moves to **SAVE_END_CODE_ST** state |
| SAVE_END_CODE_ST state | In this state, FSM saves the current PI code as ***Current Pass End code*** and FSM moves to **CHECK_ RANGE_ST** state |
| CHECK_ RANGE_ST state | In this state, FSM checks "***Current Pass Range***" is more than "***Max Pass Range***". If YES, FSM moves to **SAVE_PASS_RANGE** state to update the ***Max Pass Range***. If NO, FSM moves to **CHECK_PI_ST1** state without updating the "***Max Pass Range***". |
| SAVE_PASS_RANGE state | In this state, FSM saves "***Current Pass Range***" as "***Max Pass Range***" and FSM moves to **CHECK_PI_ST1** state |
| DONE state | This state indicates dual search operation completed and the ***Max Pass Range*** saved during this process will have the widest possible pass range and clock PI should be moved to the center of "***Max Pass Range***". |

EYE WIDTH SWEEP TEST FOR USE IN DATA TRANSMISSION

FIELD OF THE INVENTION

The present disclosure relates to data transmission and, more particularly, to an eye width sweep test for use in data transmission.

DISCUSSION OF THE RELATED ART

Serial data links (or TX/RX links) convey data over various media, such as a cable, a board trace, or backplane. Such a medium is often referred to as a channel. A channel can be imperfect and cause impairments on signals transmitted over the channel, such as attenuation, reflection, and noise (e.g., crosstalk). These impairments may lead to transmission errors. The quality of a channel can determine an upper limit on its achievable rate. Additionally, other impairments in a serial data link can degrade overall system performance. For instance, circuit non-idealities can also cause a degradation in a system's performance. Overall, minimizing impairments can enable a channel to reach or achieve higher link rates.

SUMMARY

In one or more embodiments of the present disclosure, a method for performing an eye width sweep test associated with a transmission protocol is provided. The method may include initiating, via a transmitter, data to clock training on all lanes and comparing, at a receiver, an incoming signal from the transmitter with an expected signal. The method may also include sending a pass/fail result from the receiver to the transmitter and analyzing all possible passing ranges in a single full eye width.

One or more of the following features may be included. The protocol may be a chip-to-chip protocol. Initiating may include sweeping a full range of a phase interpolator. The method may further include selecting a widest passing range based upon, at least in part, the analyzing. Selecting may include utilizing only two sets of pass registers. The two sets of pass registers may include current and maximum pass registers. The eye width sweep test may be associated with a serializer/deserializer. The eye width sweep test may be applied during PHY link training. Analyzing may be performed until a maximum phase interpolator code is reached. The chip-to-chip protocol may be a Universal Chiplet Interconnect Express (UCIe) protocol.

In another embodiment of the present disclosure, a system for performing an eye width sweep test associated with a transmission protocol is provided. The system may include initiating, via a transmitter, data to clock training on all lanes and comparing, at a receiver, an incoming signal from the transmitter with an expected signal. The system may also include sending a pass/fail result from the receiver to the transmitter and analyzing all possible passing ranges in a single full eye width.

One or more of the following features may be included. The protocol may be a chip-to-chip protocol. Initiating may include sweeping a full range of a phase interpolator. The system may further include selecting a widest passing range based upon, at least in part, the analyzing. Selecting may include utilizing only two sets of pass registers. The two sets of pass registers may include current and maximum pass registers. The eye width sweep test may be associated with a serializer/deserializer. The eye width sweep test may be applied during PHY link training. Analyzing may be performed until a maximum phase interpolator code is reached. The chip-to-chip protocol may be a Universal Chiplet Interconnect Express protocol.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIG. 8. shows an example state description table consistent with embodiments of the present disclosure;

DETAILED DESCRIPTION

Figure 1:
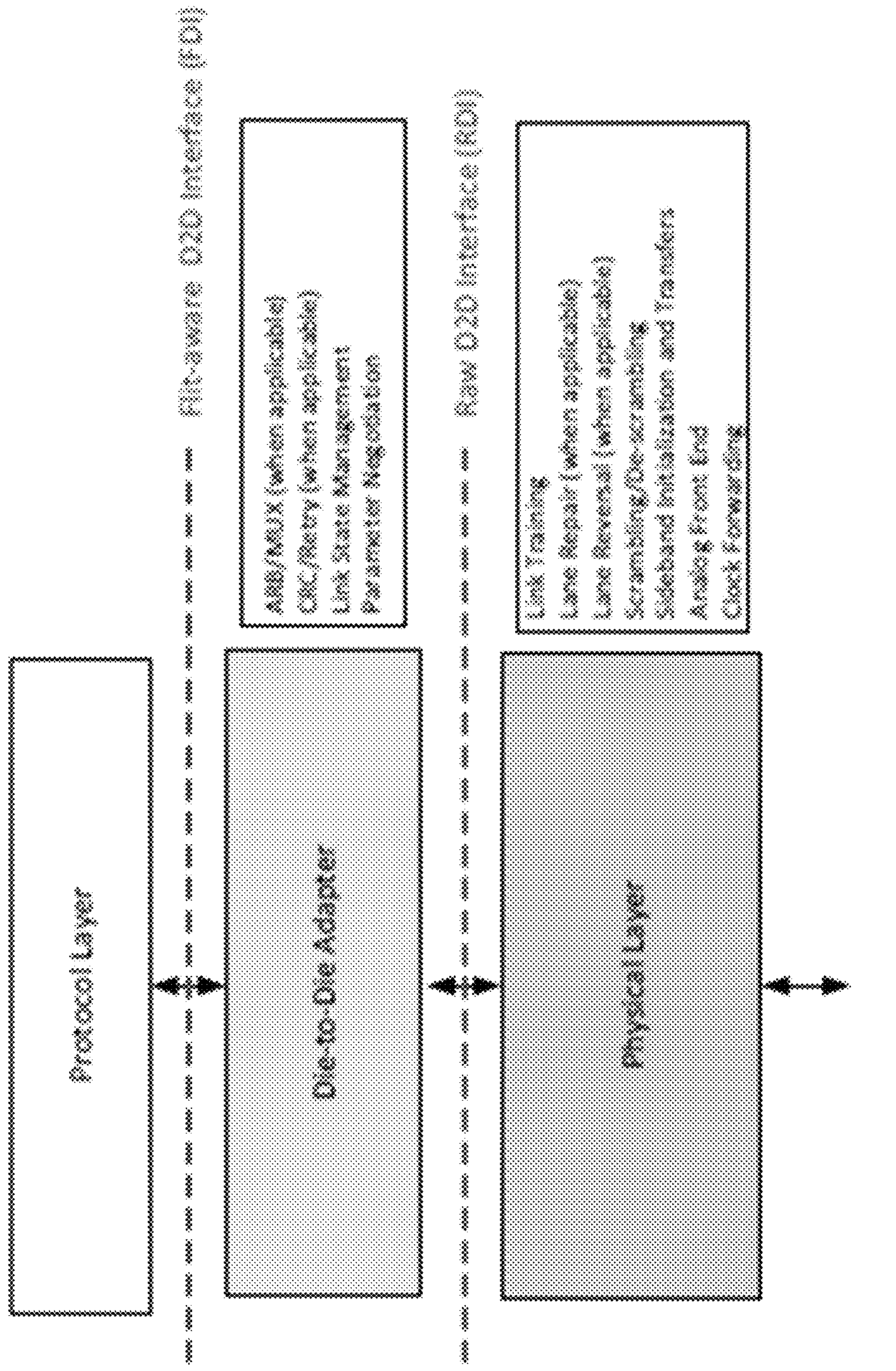
FIG. 1 shows an example diagram depicting UCIe layers consistent with the UCIe specification and embodiments of the present disclosure.

Traditionally, a data receiver comprises data comparators, clock comparators, and error comparators, each of which uses a circuit to sample a received data signal. Both data comparators and clock comparators may be used to quickly and reliably sample a received data signal. For example, a data comparator may sample the eye of a received data signal at its center and recover a data stream. For a circuit using a loop-unrolled decision feedback equalizer (DFE) (also referred to as an unrolled DFE), at least two data comparators operating at different threshold voltage values may be used. A clock comparator, which may sample the eye at its edges, may be used to perform clock recovery and alignment at the data receiver. In contrast, an error comparator is often used to measure the eye shape for diagnostic purposes or to position a data sampler at the best sampling location using a servo loop. A conventional error comparator is usually able to sample any point in the eye. An error comparator typically uses a data sampler that has a large threshold voltage range (e.g., one that can cover for the sum of random offsets, target threshold voltage, and first tap value; voltage range can reach 300-400 mV peak differential).

As data rates increase between a data transmitter and a data receiver, bit duration (also referred to as a unit interval or UI) gets smaller; and smaller UIs reduce allowed timing errors within a data receiver. Higher data rates also means that overall, a data receiver has to perform operations faster. Half-rate and quarter-rate data sampling (by a data sampler) may be used to reduce speed requirements of the clocking generation and distribution inside a receiver. For example, in a half-rate data receiver, two clock signals spaced 180° apart may be used, where each clock signal's rising edge causes sampling of one incoming bit from a received data signal. Usually, for a half-rate data receiver, twice as many clock signals running at half the line rate speed are required. In comparison, in a quarter-rate data receiver, four clock signals spaced 90° apart may be used, where each clock signal's rising edge causes sampling of one incoming bit from a received data signal. Usually, for a quarter-rate data receiver, four times as many clock signals running at a quarter of the line rate speed are required. Additionally, another set of complementary clock signals in quadrature can be used to sample transitions (e.g., detect edges). A quarter-rate data receiver is often used for high-rate data links, such as those operating at 32 Gbps.

Conventional data receivers are known to use a DFE (which is a non-linear equalizer) to compensate for inter-symbol interface (ISI) present within a received data signal (e.g., received from a data transmitter). Specifically, a DFE may use a data sampler to determine (e.g., make a decision on) a value of an incoming bit of a received data signal (e.g., thereby quantizing the received data signal) for a current UI, may obtain a value of a preceding bit (e.g., value of bit from one UI before) via a first tap of the DFE, may scale the value of the preceding bit by a coefficient (e.g., tap weight) associated with the first tap, and may apply the scaled value to a next incoming bit of the received signal by adding the scaled value to, or subtracting the scaled value from, the received signal via an analog summer. Generally, where only DFE-based equalization is used at a data receiver, the one or more tap weights (associated with the different taps) of the DFE would equal the non-equalized channel pulse response values for the incoming data signal (e.g., [a1, a2, . . . an]).

As used herein, a data sampler may include a data slicer (or slicer) that may refer to an edge triggered device configured to sample a signal on a rising edge of a clock signal and reset when the clock signal is low.

Reference will now be made in detail to embodiments of the present disclosure, examples of which are illustrated in the appended drawings. The present disclosure may, however, be embodied in many different forms and should not be construed as being limited to the embodiments set forth herein.

Referring now to FIG. 1, an example diagram depicting UCIe layers consistent with embodiments of the present disclosure is provided. Embodiments included herein are directed towards an eye sweep method that may be used in any suitable protocol (e.g., UCIe PHY) to select optimal clock position in false eye scenarios. Universal Chiplet Interconnect express (UCIe) is an open, multi-protocol capable, on-package interconnect standard for connecting multiple dies on the same package. UCIe is a layered protocol, with each layer performing a distinct set of functions. As shown in FIG. 1, UCIe may include a protocol layer, a D2D adaptor, and a physical layer.

Figure 2:
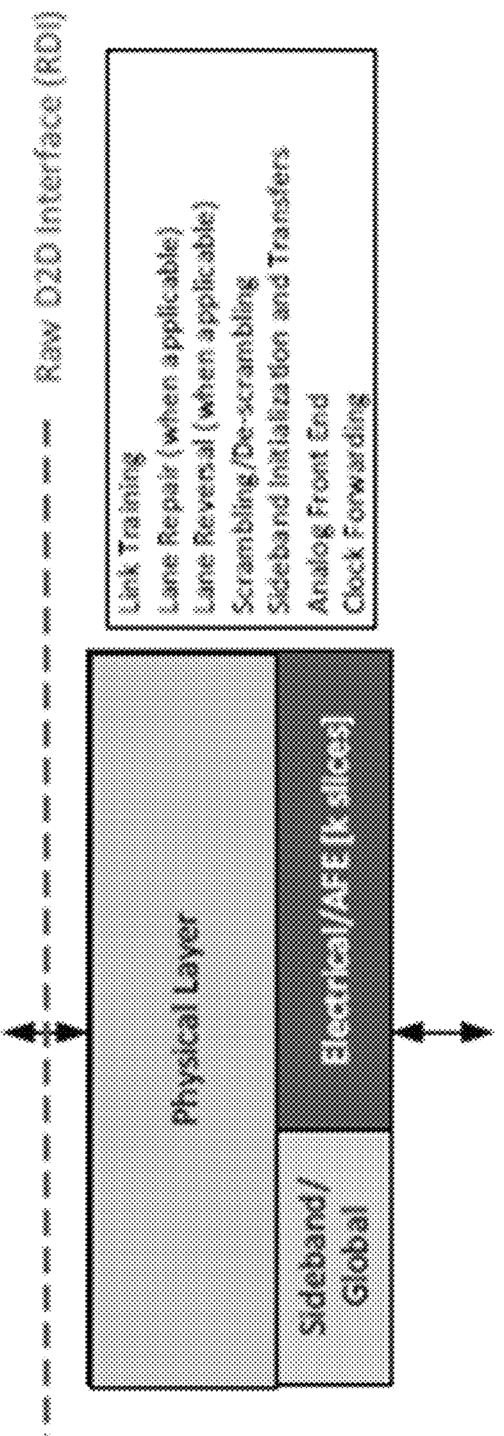
FIG. 2 shows an example diagram depicting physical layer components consistent with the UCIe specification and embodiments of the present disclosure.

Referring now to FIG. 2, an example diagram depicting physical layer components consistent with embodiments of the present disclosure is provided. The physical layer of UCIe may include multiple connections. The Sideband (SB) connection may be used for parameter exchanges, register accesses for debug/compliance and co-ordination with remote partner for link training and management. The Main-Band (MB) may include a data interface where actual data flow occurs. It may include a forwarded clock, a data valid pin, and N lanes of data per module.

Figure 3:
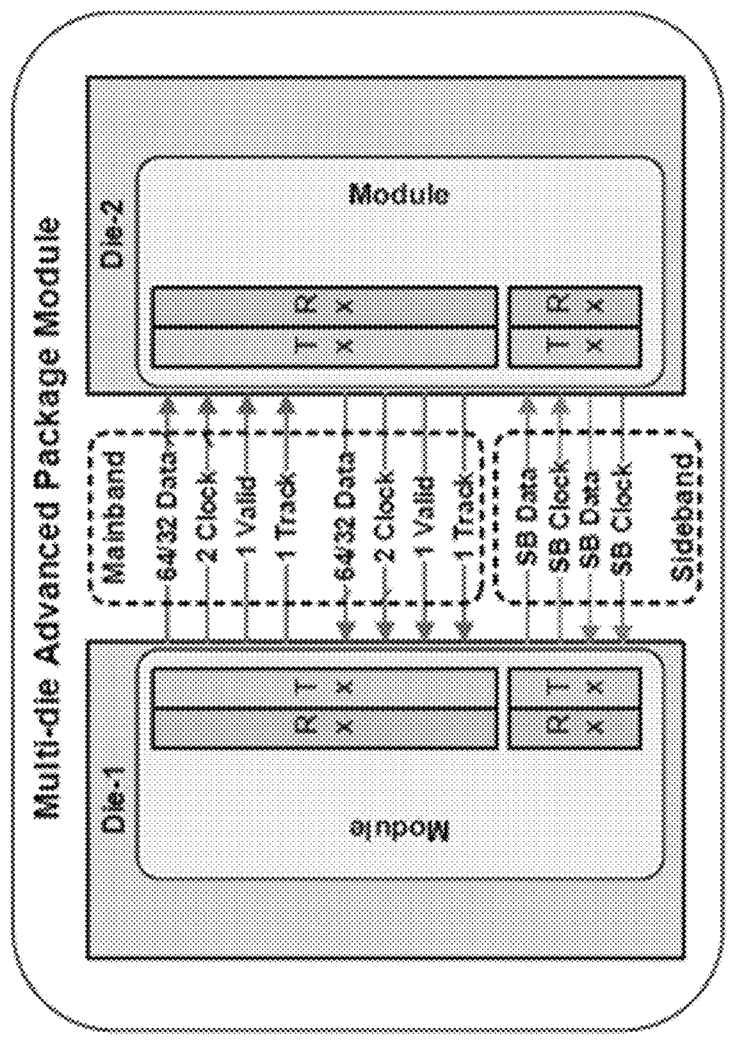
FIG. 3 shows an example diagram depicting a multi-die advanced package module consistent with the UCIe specification and embodiments of the present disclosure.

Referring now to FIG. 3, an example diagram depicting a multi-die advanced package module consistent with embodiments of the present disclosure is provided. In this example, the UCIe physical interface may include one or more building blocks referred to as modules. A module that uses advanced packaging technology (e.g., embedded multi-die interconnect bridge (EMIB), chip on wafer on substrate (CoWoS)) called an "Advanced Package Module" consists of a pair of clocks, 64 or 32 single-ended data lanes for x64 or x32 Advanced Package Module, respectively, a data valid lane each direction (transmit and receive) and a track lane. There is a low-speed sideband bus for initialization, link training, and configuration reads/writes. The sideband may include a single-ended sideband data lane and single-ended sideband clock lane in both directions (transmit and receive).

Figure 4:
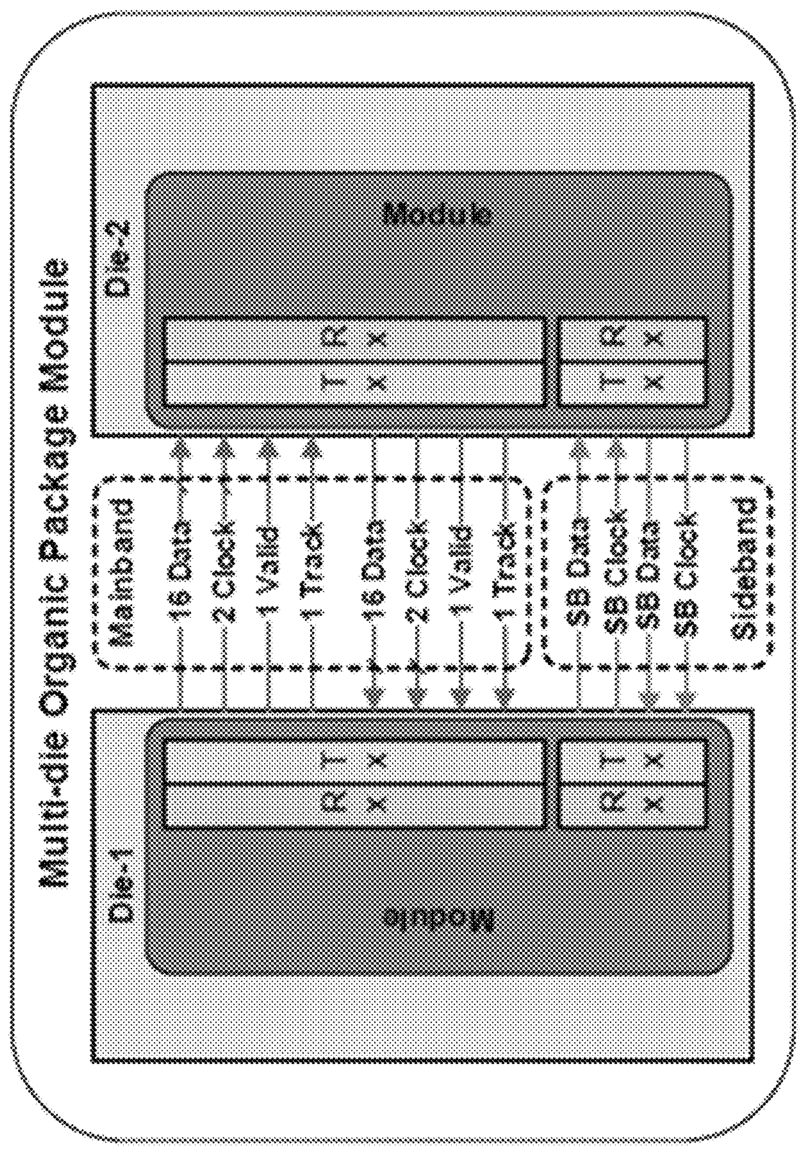
FIG. 4 shows an example diagram depicting a multi-die organic package module consistent with the UCIe specification and embodiments of the present disclosure.

Referring now to FIG. 4, an example diagram depicting a multi-die organic package module consistent with embodiments of the present disclosure is provided. The "Standard Package Module" may utilize a traditional standard packaging with a larger pitch. A Standard Package Module may include a pair of clocks, 16 single-ended data Lanes, a data valid Lane and Track Lane in each direction (transmit and receive). There is a low-speed sideband bus for initialization, link training, and configuration reads/writes. The sideband may include a single-ended sideband data lane and single-ended sideband clock Lane in both directions (transmit and receive).

As discussed above, in UCIe, an eye width sweep test is the basic training tool used during PHY link training and margining. In this test, the transmitter (Tx) may initiate data to clock training on all lanes by sweeping full range of phase interpolator (PI). At each PI position, the receiver (Rx) may compare the incoming signal with the expected signal and sends the pass/fail result back to Tx. Based on the results, the Tx may need to identify the passing range and place the clock at the center of the passing range.

In some cases (due to a distorted eye), there could be a possibility of multiple pass ranges and conventional techniques may place the clock at the center of first pass range which may not be optimal position and gives less system margin and susceptible to bit errors. Embodiments included herein may be configured to analyze all possible passing ranges in single full eye width sweep and selects the widest passing range thereby providing good system margin.

Figure 5:
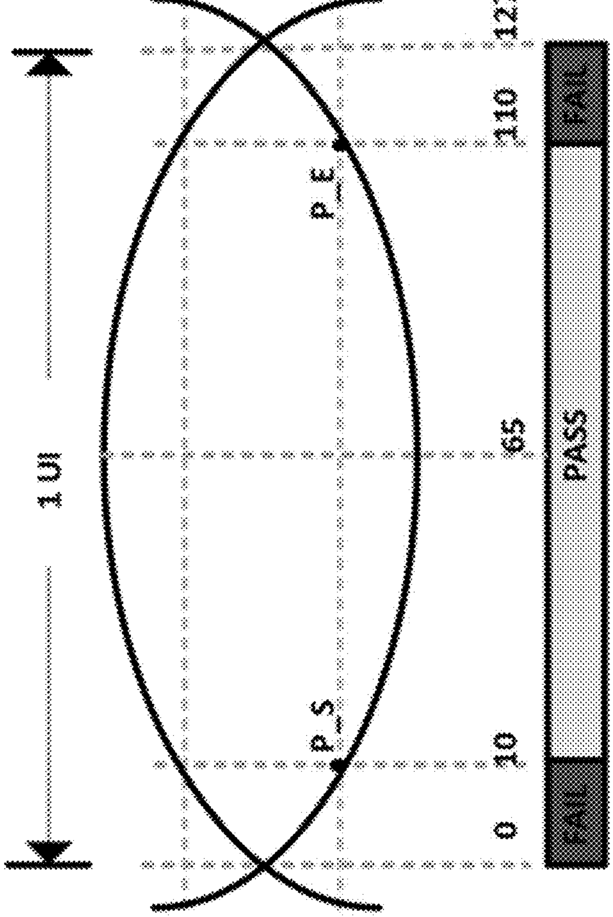
FIGS. 5-6 show example eye diagrams consistent with embodiments of the present disclosure.
Figure 6:
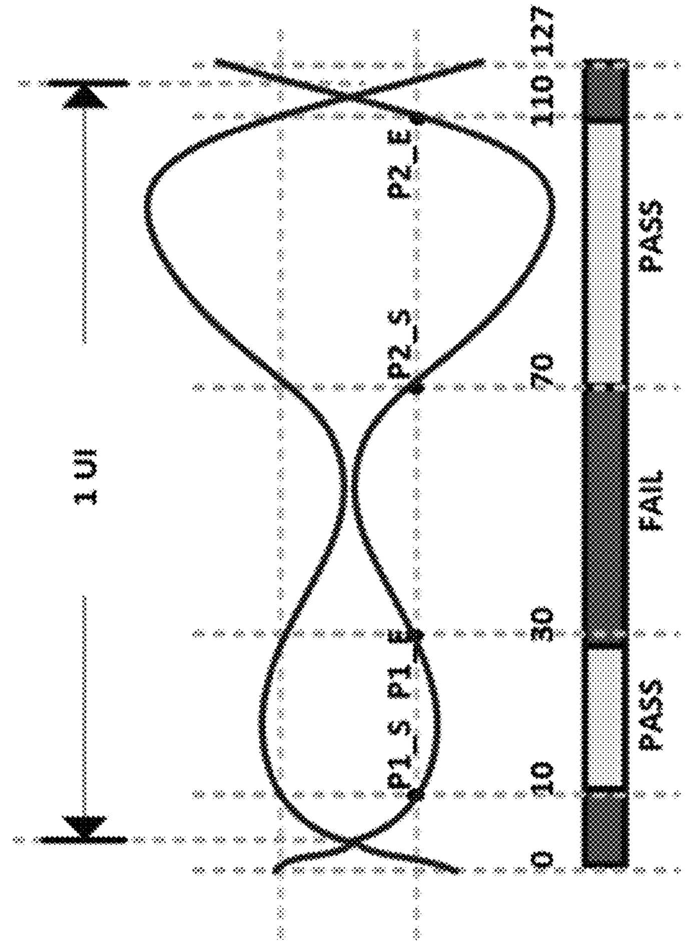

Referring now to FIGS. 5-6, example eye diagrams consistent with embodiments of the present disclosure are provided. A conventional eye width sweep test implements a linear search technique where the clock phase interpolator code is swept from one end of the PI position in single steps until the start of error free data reception. Once start of error free data point is found (P_S), sweeps the clock further in the same direction until the errors start coming in the data reception (P_E). In some existing approaches the method may select this initial passing range as open eye and place the clock at the center of this eye (at PI position of 65 in FIG. 5). However, the problem with this technique is that if the eye is distorted or not opened properly, there could be a possibility of multiple pass ranges say (P1_S to P1_E) and (P2_S to P2_E) as shown in FIG. 6. The conventional methods could select a smaller passing range (P1_S to P1_E) and could place the clock at the center of this smaller passing range rather than the wider passing range (P2_S to P2_E).

Figure 7:
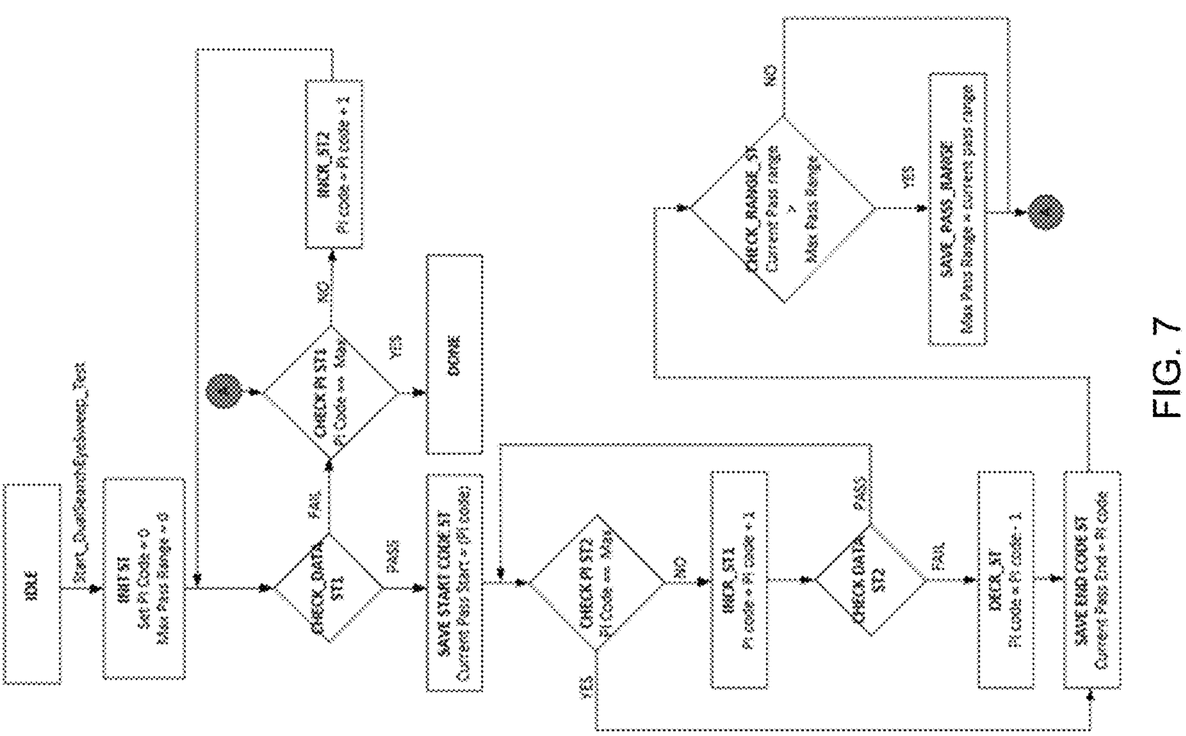
FIG. 7 shows an example flowchart consistent with embodiments of the present disclosure.
Figure 9:
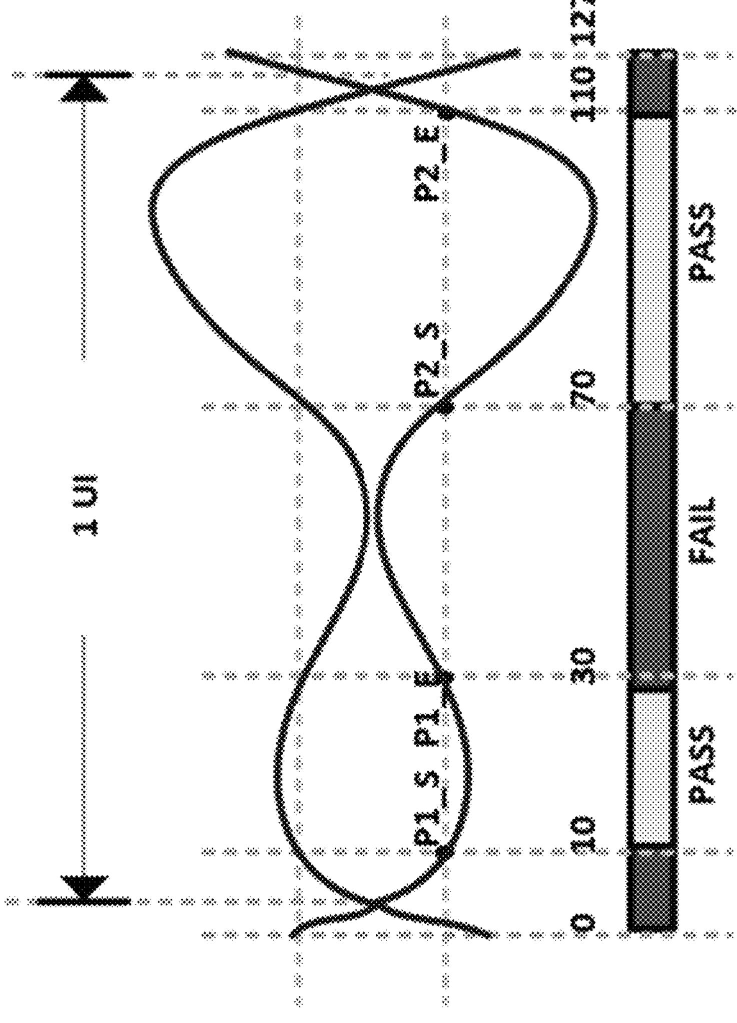
FIG. 9 shows an example eye diagram consistent with embodiments of the present disclosure.

Referring now to FIGS. 7-8, an example flowchart and associated state description table consistent with embodiments of the present disclosure are provided. To address some of the issues of conventional approaches, embodiments of the present disclosure may be configured to continue the search beyond the initial passing range, until the maximum phase interpolator code is reached and may then select the widest passing range. Exemplary pass/fail diagrams are provided in FIG. 9.

In operation, the process may first initialize the phase interpolator code to 0 (min value) and the maximum pass range as 0. The process may start sweeping the clock phase from the phase interpolator phase position of 0 in steps of 1 until the start of error free data reception. As shown in FIG. 7, this initial error free data reception is marked as P1_S (PI code of 10), and may be saved as current pass start code. The clock phase may be swept further in the same direction until errors start coming in the data reception. The current phase interpolator code may be decremented by 1. This point is marked as P1_E in FIG. 9 (PI code of 30), will be saved as current pass end code. Using P1_S and P1_E, the width of the current passing range may be calculated (20 in this example) and compared against the maximum pass range. If the current pass range is more than the maximum pass range, the current pass range may be copied into the maximum pass range. If not, then the process may continue to sweep the phase interpolator in the same direction until the start of another error free data reception. The point where another pass may be recorded may be marked as P2_*s* (PI code of 70) in FIG. 9 and may be saved as the current pass start code. The phase interpolator may be swept again in the same direction until errors start occurring in the data reception. At this state, the current phase interpolator position may be decremented by 1. This point is marked as P2_*e* (PI code of 110). Using P2_*s* and P2_*e*, the current pass range may be calculated (which is 40 in this case) and compared with first pass range (20). Since the current pass range is greater than the maximum pass range, the current pass range may be copied as the maximum pass range. The process may continue the search for another pass range by sweeping the phase interpolator in the same direction until the current phase interpolator code reaches the maximum phase interpolator code (127 in this example). In this particular example, there is no third pass range and so the process may conclude when the phase interpolator code reaches 127 and at that time the pass range stored in the maximum pass range may be declared the widest pass range in the full phase interpolator sweep.

Figure 10:
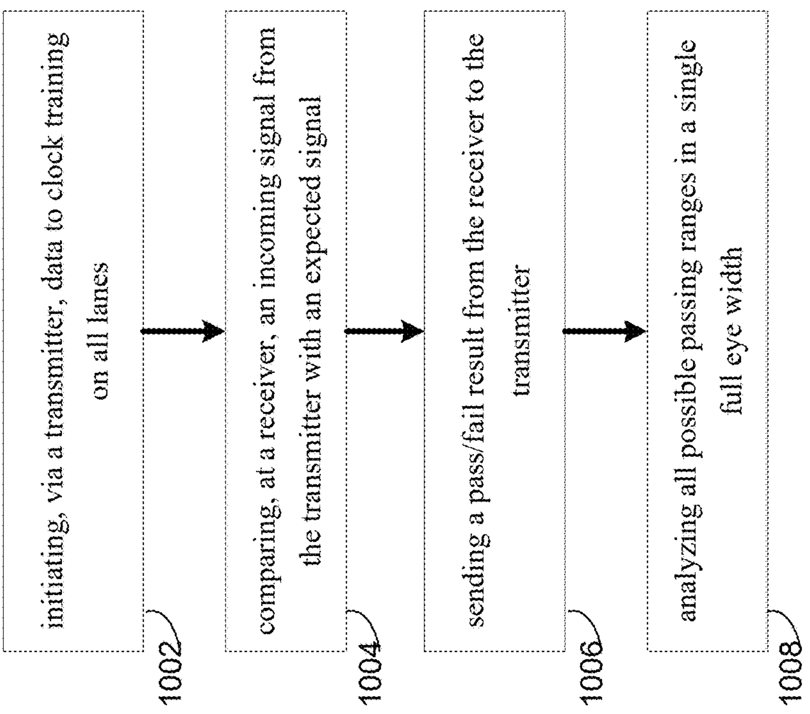
FIG. 10 shows an example flowchart consistent with embodiments of the present disclosure.

Referring now to FIG. 10 a flowchart 1000 showing operations consistent with embodiments of the present disclosure is provided. Flowchart 1000 shows a method for performing an eye width sweep test associated with a transmission protocol. The method may include initiating 1002, via a transmitter, data to clock training on all lanes and comparing 1004, at a receiver, an incoming signal from the transmitter with an expected signal. The method may also include sending 1006 a pass/fail result from the receiver to the transmitter and analyzing 1008 all possible passing ranges in a single full eye width. Numerous other operations are also within the scope of the present disclosure.

As discussed above, embodiments included herein provide a robust eye-width sweep methodology for distorted eye scenarios. In some embodiments, only two sets of pass registers are necessary as methodologies included herein may be configured to determine any number of pass ranges and may be able to pick the wider pass range. While some embodiments are directed towards UCIe PHY training hardware implementations it should be noted that some embodiments may be used in other implementations, including, but not limited to, serializer/deserializer (SerDes) eye-width sweep methodologies, etc.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A method for performing an eye width sweep test associated with a transmission protocol, comprising:

initiating, via a transmitter, data to clock training on all lanes;

comparing, at a receiver, an incoming signal from the transmitter with an expected signal;

sending a pass/fail result from the receiver to the transmitter;

analyzing all possible passing ranges in a single full eye width;

wherein the transmission protocol is a Universal Chiplet Interconnect Express (UCIe) protocol; and selecting a widest passing range based upon, at least in part, the analyzing, wherein selecting utilizes only two sets of pass registers.

2. The method of claim 1, wherein the protocol is a chip-to-chip protocol.

3. The method of claim 1, wherein initiating includes sweeping a full range of a phase interpolator.

4. The method of claim 1, wherein the two sets of pass registers include current and maximum pass registers.

5. The method of claim 1, wherein the eye width sweep test is associated with a serializer/deserializer.

6. The method of claim 1, wherein the eye width sweep test is applied during PHY link training.

7. The method of claim 1, wherein analyzing is performed until a maximum phase interpolator code is reached.

8. A system for performing an eye width sweep test associated with a transmission protocol, comprising:

a transmitter configured to initiate data to clock training on all lanes;

a receiver configured to compare an incoming signal from the transmitter with an expected signal, wherein the receiver is configured to send a pass/fail result to the transmitter and wherein the system is configured to analyze all possible passing ranges in a single full eye width, and wherein the system is configured to select a widest passing range based upon, at least in part, the analyzing, wherein selecting utilizes only two sets of pass registers; and wherein the transmission protocol is a Universal Chiplet Interconnect Express (UCIe) protocol.

9. The system of claim 8, wherein the protocol is a chip-to-chip protocol.

10. The system of claim 8, wherein initiating includes sweeping a full range of a phase interpolator.

11. The system of claim 8, wherein the two sets of pass registers include current and maximum pass registers.

12. The system of claim 8, wherein the eye width sweep test is associated with a serializer/deserializer.

13. The system of claim 8, wherein the eye width sweep test is applied during PHY link training.

14. The system of claim 8, wherein analyzing is performed until a maximum phase interpolator code is reached.

* * * * *